United States Patent
Harada

[11] Patent Number: 5,968,437
[45] Date of Patent: Oct. 19, 1999

[54] METHOD FOR INTEGRALLY MOLDING A THERMOPLASTIC LAMINATED ASSEMBLY

[75] Inventor: Hiromitsu Harada, Kanagawa-ken, Japan

[73] Assignee: Kasai Kogyo Co., Ltd., Tokyo-to, Japan

[21] Appl. No.: 08/956,289

[22] Filed: Oct. 23, 1997

Related U.S. Application Data

[62] Division of application No. 08/558,002, Nov. 13, 1995, Pat. No. 5,759,588.

[51] Int. Cl.$^6$ .................................................. B26C 45/14
[52] U.S. Cl. .................. 264/266; 264/275; 264/DIG. 57; 425/112; 425/125
[58] Field of Search .................................. 264/266, 275, 264/328.7, DIG. 57; 425/112, 125

[56] References Cited

U.S. PATENT DOCUMENTS

| | | | |
|---|---|---|---|
| 4,570,897 | 2/1986 | Von Holdt | 249/144 |
| 5,068,065 | 11/1991 | Maus et al. | 264/1.3 |
| 5,178,815 | 1/1993 | Yokote et al. | 264/259 |
| 5,429,786 | 7/1995 | Jogan et al. | 264/255 |
| 5,679,301 | 10/1997 | Miklas et al. | 264/161 |

Primary Examiner—Jan H. Silbaugh
Assistant Examiner—Edmund H. Lee
Attorney, Agent, or Firm—Dickstein Shapiro Morin & Oshinsky LLP

[57] ABSTRACT

In a mold press forming process for integrally molding a resin core member and a surface skin member, prior to the step of forming the resin core member, a surface skin member is retained between an upper die half and a lower die half by a surface skin retaining frame which consists of a fixed segment and a moveable segment. The moveable segment is moved vertically relatively to the fixed segment to better adapt the surface skin member to a three-dimensional parting line between the upper and lower half dies. When mounting the surface skin member onto the surface skin retaining frame presents a planar mounting surface, the mounting work is facilitated, and automated mounting devices can be used without any problem. Because the surface skin member can be stretched to a shape which approximately conform to the final shape of the laminated assembly by virtue of the moveable segment of the surface skin retaining frame, the surface skin member is prevented from being stretched excessively in localized parts thereof. Therefore, the surface skin member is prevented from being excessively thinned, whitened or ruptured during the molding process. Residual stress in the surface skin member is also minimized so that the molded laminated assembly is made free from warping which could be caused by excessive stretching of the surface skin member during the molding process.

8 Claims, 8 Drawing Sheets

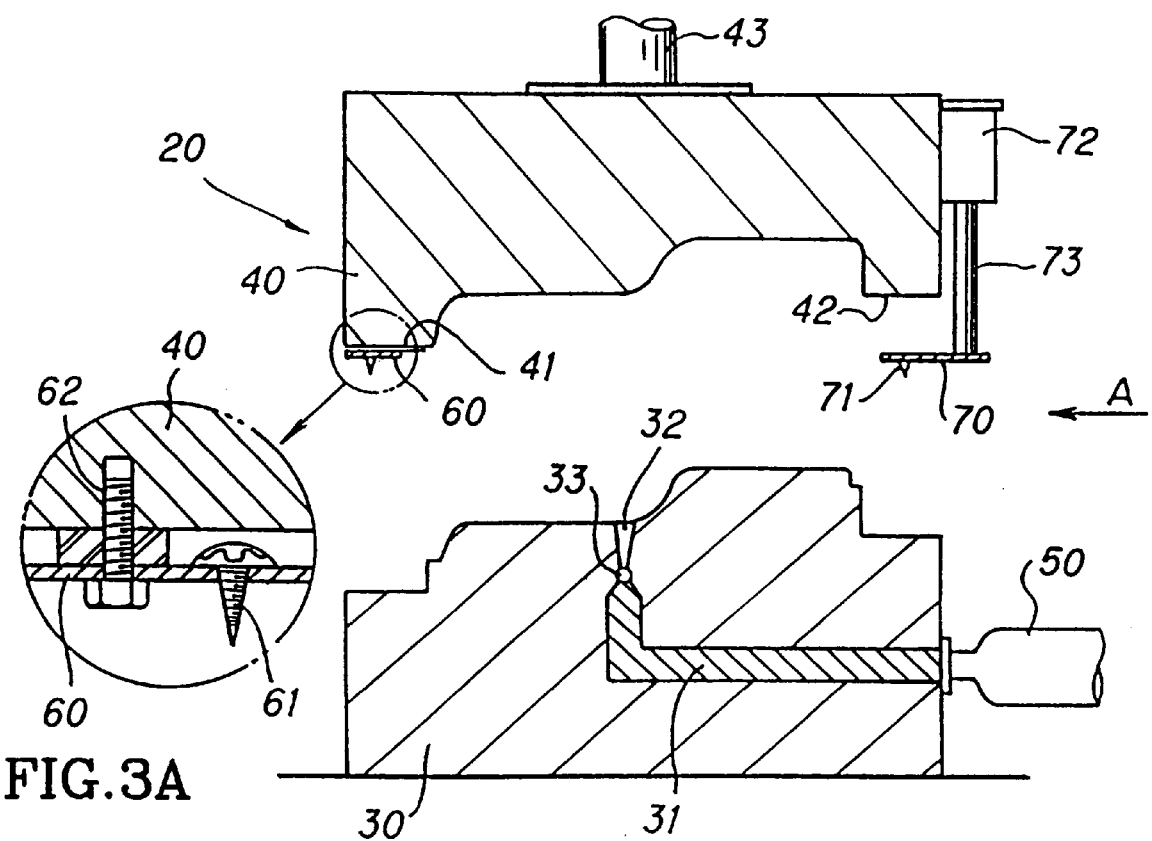
FIG. 3
FIG. 3A
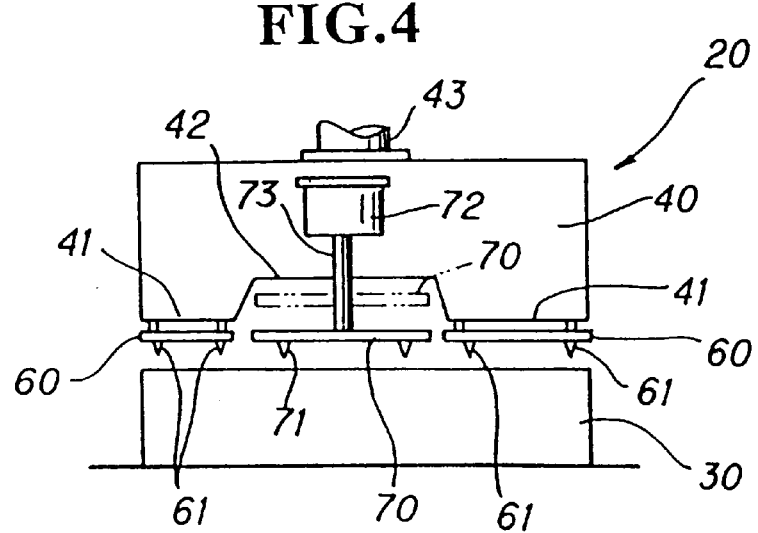
FIG. 4

5,968,437

METHOD FOR INTEGRALLY MOLDING A THERMOPLASTIC LAMINATED ASSEMBLY

This application is a divisional of U.S. patent application Ser. No. 08/558,002, filed Nov. 13, 1995, now U.S. Pat. No. 5,759,588.

TECHNICAL FIELD

The present invention relates to a method and a device for molding a laminated assembly which is suitable for use as an automotive upholstery component.

BACKGROUND OF THE INVENTION

Conventionally, a typical automotive upholstery component, which is suitable for use on the inner wall surface of vehicle body panels, consists of a laminated assembly of a resin core member and a surface skin member. The resin core member is molded into a desired shape, and is provided with a sufficient rigidity to retain its shape, and to be securely mounted on the vehicle body panel. The surface skin member is provided with a suitable cushioning property.

In recent years, the resin core member is given with increasingly complicated, three-dimensional shapes, and the molding process known as a mold press forming process has been widely used for producing such resin core members. To simplify the molding process, the surface skin member is often attached to the surface of the resin core member simultaneously as the resin core member is molded into a desired shape.

FIG. 12 illustrates a typical conventional arrangement for molding an assembly consisting of a resin core member and a surface skin member. First of all, a surface skin member 3 is placed on a surface skin retaining frame 2 of an upper die half 1 of a mold press forming die assembly, and the upper die half 1 is lowered along with the surface skin retaining frame 2. As illustrated in FIG. 13, when a certain gap is defined between the upper die half 1 and a lower die half 4 of the die assembly, molten resin M for forming a resin core member is distributed over the die surface of the lower die half 4 from an injection molding device 5 connected to the lower die half 4. Thereafter, as illustrated in FIG. 14, the two die halves 1 and 4 are closed upon each other so that a resin core member 6 is mold press formed into a prescribed shape while the surface skin member 3 is integrally attached to the surface of the resin core member 6.

The parting line of the die assembly normally lies on a single plane, but modern vehicle design requires highly complex upholstery components which involve three-dimensional parting lines as shown in FIG. 15. In such a case, a gap h is created between the general parting line a and the special parting line b as illustrated in FIG. 16. Because the parting line thus does not lie on a single plane and, in particular, because the surface skin retaining frame 2 is spaced from the special parting line b, the part of the surface skin member 3 adjoining the special parting line b tends to be excessively stretched during the molding process with the result that parts of the surface skin member 3 may be excessively stretched, thinned or whitened or may be even ruptured. Even when such catastrophic results are avoided, due to the excessive tension applied to the surface skin member 3, the spring back of the surface skin member 3 may cause warping or other deformation to the resin core member 6 attached thereto with the result that undesirable gaps may be created between the laminated assembly, and the vehicle panel member or the laminated assembly may interfere with adjoining components.

BRIEF SUMMARY OF THE INVENTION

In view of such problems of the prior art, a primary object of the present invention is to provide a method and a device for molding a laminated assembly which is suitable for use as an automotive upholstery component which can prevent the rupture, thinning or whitening of the surface skin member even when the parting line involves a highly complex three-dimensional shape.

A second object of the present invention is to provide a method and a device for molding a laminated assembly which allows the laminated assembly to be molded without causing any spring back in the molded assembly even when the parting line involves a highly complex three-dimensional shape.

A third object of the present invention is to provide a method and a device for molding a laminated assembly which are suitable for applications involving a three-dimensional parting line of the die assembly, and which is easy and economical to implement.

According to the present invention, these and other objects can be accomplished by providing a method for integrally molding a laminated assembly of a resin core member and a surface skin member in a mold press forming die assembly, which includes a first die half and a second die half defining a three-dimensional parting line therebetween, and a surface skin retaining frame including a moveable segment and a fixed segment; comprising the steps of: aligning the moveable segment of the surface skin retaining frame with the fixed segment thereof so as to define a substantially planar mounting surface for mounting a surface skin member thereon; mounting a surface skin member made of deformable synthetic resin material on the planar mounting surface of the surface skin retaining frame; moving the moveable segment of the surface skin retaining frame relative to the fixed segment thereof to somewhat conform and better adapt a peripheral part of the surface skin member to the three-dimensional parting line; supplying molten thermoplastic resin material onto a die surface of one of the die halves; and closing the first die half and the second die half of the mold press forming die assembly relative to each other to finally form the resin core member and integrally attach the surface skin member onto a surface of the resin core member.

This method can be conveniently implemented by using a device comprising: a first die half having a first die surface including means for supplying molten material for the resin core member on the first die surface; a second die half having a second die surface substantially complementary to the first die surface, the first and second die surfaces defining a three dimensional parting line; die assembly actuating means for selectively opening and closing the die halves relative to each other; a surface skin retaining frame for retaining a surface skin member over one of the die surfaces, and including a moveable segment and a fixed segment; and frame actuating means for moving the moveable segment relative to the fixed segment.

When mounting the surface skin member onto the surface skin retaining frame presents a planar mounting surface, the mounting work is facilitated, and automated mounting devices can be used without any problem. Because the surface skin retaining frame comprises a fixed segment and a moveable segment which be moved relative to the fixed segment, the surface skin member can be stretched to a shape which approximately conforms to the final shape of the laminated assembly so that the surface skin member is prevented from being stretched excessively in localized parts thereof. Therefore, the surface skin member is prevented from being excessively thinned, whitened or ruptured during the molding process. Residual stress in the surface skin member is also minimized so that the molded laminated assembly is made free from warping which could be caused by excessive stretching of the surface skin member during the molding process.

According to a preferred embodiment of the present invention, the frame actuating means comprises a powered actuator for moving the moveable segment substantially perpendicularly to a general plane of the die surfaces. Alternatively, the fixed segment of the surface skin retaining frame may be securely attached to one of the die halves while the moveable segment of the surface skin retaining frame is attached to the one die half via a spring urged lost motion mechanism, the other die half being provided with a stopper post which engages the moveable segment of the surface skin retaining frame and displaces the moveable segment relative to the fixed segment as the one die half is moved toward the other die half. According to this embodiment, the need for a powered actuator is eliminated, and the cost for the molding device can be minimized.

The movement of the moveable segment of the surface skin retaining frame can be effected in a number of different relationships to the movement of the mold press forming die assembly. Preferably, the moveable segment of the surface skin member retaining frame occurs after the surface skin member is mounted on the surface skin retaining frame and before the die assembly is fully closed. According to a simple sequence, the moveable segment of the surface skin member retaining frame is moved by the prescribed stroke, and the die assembly is then closed from its fully open state to its fully closed state. Alternatively, the die assembly may be halfway closed initially, and the moveable segment of the surface skin member retaining frame is then moved by the prescribed stroke, which is followed by the full closure of the die assembly. This is advantageous in carrying out the mold press molding process in a highly satisfactory manner.

To reduce the time required to complete each molding cycle, the moveable segment of the surface skin retaining frame may be moved relative to the fixed segment thereof at least partly simultaneously as the first die half and the second die half of the mold press forming die assembly are closed relative to each other.

BRIEF DESCRIPTION OF THE DRAWINGS

Now the present invention is described in the following with reference to the appended drawings, in which:

FIG. 3 is a sectional view of an embodiment of a molding device according to the present invention;

FIG. 3A is an enlargement of a portion of FIG. 3;

FIG. 4 is a view as seen from arrow A of FIG. 3;

DETAILED DESCRIPTION OF THE PREFERRED EMBODIMENTS

Figure 1:
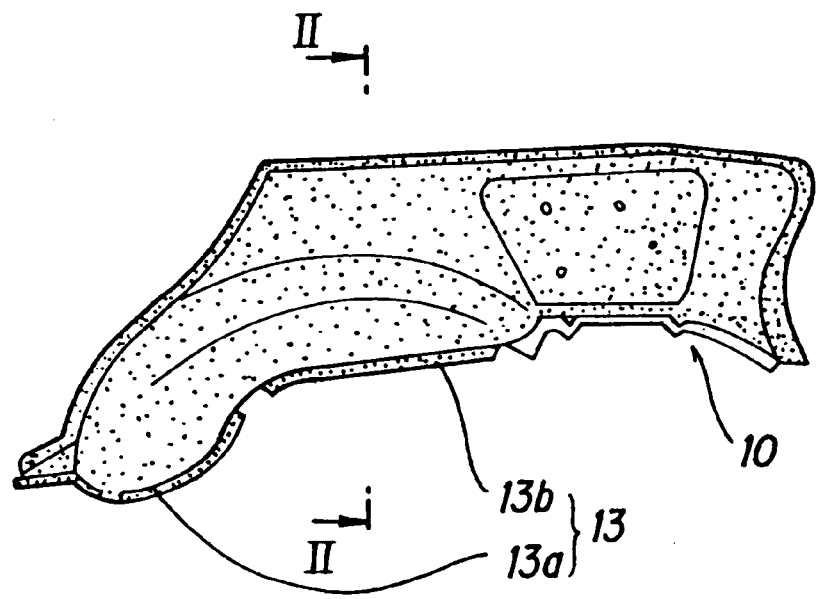
FIG. 1 is a front view of an automotive luggage compartment side trim which is fabricated according to the present invention.
Figure 2:
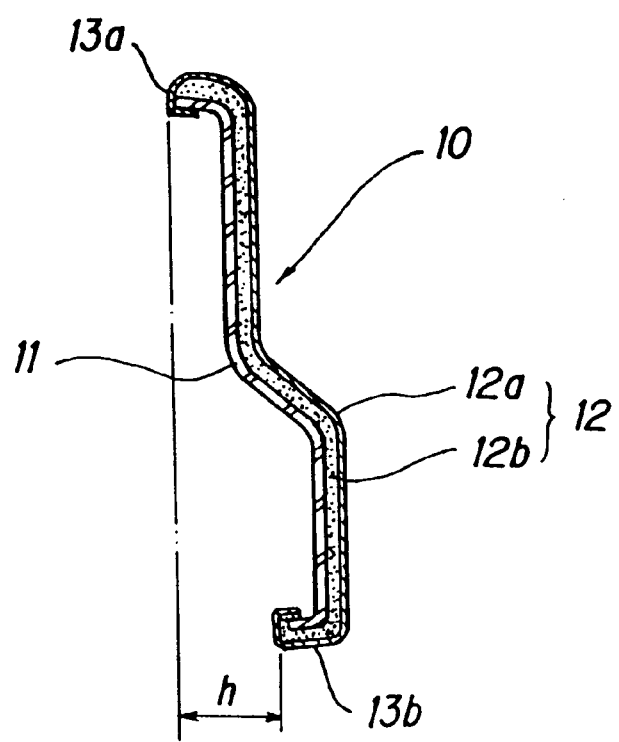
FIG. 2 is a sectional view taken along line II—II of FIG. 1.

FIGS. 1 and 2 illustrate a luggage compartment side trim 10 given as an example of the molded laminated assembly fabricated according to the present invention. The luggage compartment side trim 10 is an automotive upholstery component which is applied to the inner surface of the vehicle body panel on each inner side wall of the luggage compartment provided in the rear part of the vehicle body, and essentially consists of a substantially planar resin core member 11 which is molded into a desired curved shape, and a surface skin member 12 integrally attached to the surface of the resin core member 11.

More specifically, the resin core member 11 is formed by molding a thermoplastic composite resin material, including 90 weight parts of polypropylene resin and 10 weight parts of talc, into a desired curved shape by the mold press forming process which is described in more detail hereinafter. During the mold press forming process, a surface skin member 12, which consists of a top layer 12 made of polyvinyl chloride or other deformable material optionally provided with a lining 12, for instance, made of foamed polyethylene, is integrally attached to the surface of the resin core member 11. The peripheral edge 13 of the luggage compartment side trim 10 is not located on a single plane, but consists of a general parting line 13a and a special parting line 13b which projects more toward the interior of the luggage compartment by a distance h than the general parting line 13a as illustrated in FIG. 2. Thus, the luggage compartment side trim 10 given in this embodiment is provided with a parting line which is defined by a three-dimensional shape.

A first embodiment of the molding device 20 for mold press forming the luggage compartment side trim 10 is described in the following with reference to FIGS. 3 and 4. The molding device comprises a die assembly essentially consisting of a lower die half 30 having a prescribed die surface, and an upper die half 40, which is positioned above the lower die half 30 and provided with a die surface substantially complementary to that of the lower die half 30. The upper die half 40 is connected to an elevating mechanism 43 for moving the upper die half 40 toward and away from the lower die half 30 as required. The molding device is further provided with an injection molding device 50 for supplying molten resin M, which is the material for the resin core member 11, to the die surface of the lower die half 30.

The lower die half 30 is internally provided with a manifold 31 communicating with the injection molding device 50 as well as to a plurality of gates 32 opening at appropriate locations of the die surface of the lower die half 30. Therefore, the thermoplastic molten resin material M supplied from the injection molding device 50 is expelled from the gates 32 and is distributed over the die surface of the lower die half 30 by appropriately controlling gate valves 33 associated with the gates 32.

In particular, because the peripheral edge of the luggage compartment side trim 10 is provided with a three dimensional shape, the parting line between the upper and lower die halves 30 and 40 consists of a general parting line 41 and a special parting line 42 which is more elevated than the general parting line 41 by a distance h as illustrated in FIG. 2. The molding device 20 further comprises an annular surface skin retaining frame extending along the peripheral region of the die surface of the upper die half 40 for retaining the surface skin member 12 before integrally attaching the surface skin member 12 to the resin core member 11 during the molding process. The surface skin retaining frame consists of a fixed segment 60 and a moveable segment 70 which is vertically moveable relative to the fixed segment 60 by a prescribed stroke.

The fixed segment 60 of the surface skin retaining frame, corresponding to the general parting line 41, is fixedly secured to the upper die half 40 by threaded bolts 62, and is provided with a plurality of pointed piercing pins 61 each directed downward. The moveable segment 70 of the surface skin retaining frame, corresponding to the special parting line 42, is fixedly secured to the lower end of a piston rod 73 of an air cylinder 72, and is provided with a plurality of pointed piercing pins 71 each likewise directed downward. By the activation of the air cylinder 72, the moveable segment 70 of the surface skin retaining frame can move vertically between the two positions indicated by solid lines and dotted lines, respectively, in FIG. 4.

The mode of fabricating the luggage compartment side trim 10 illustrated in FIGS. 1 and 2 by using the above described device is described in the following with reference to FIGS. 5 to 9.

Figure 5:
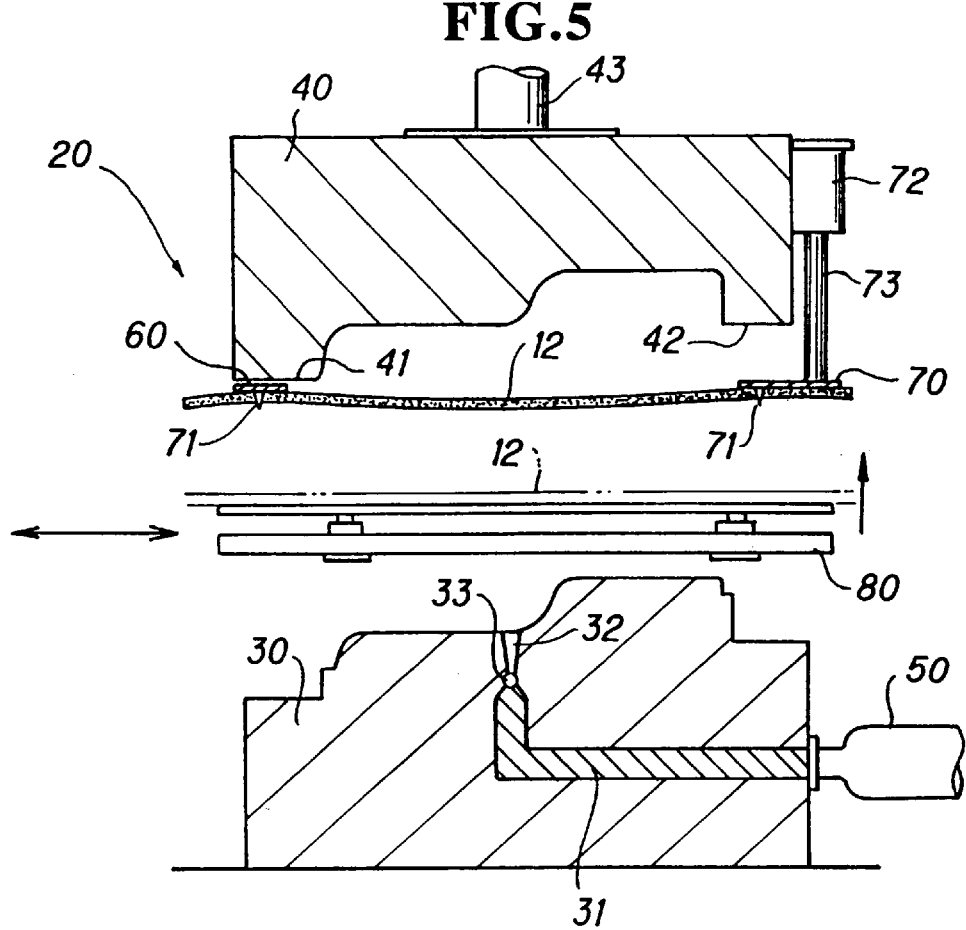
FIG. 5 is a sectional view showing the step of mounting a surface skin member according to the present invention.
Figure 6:
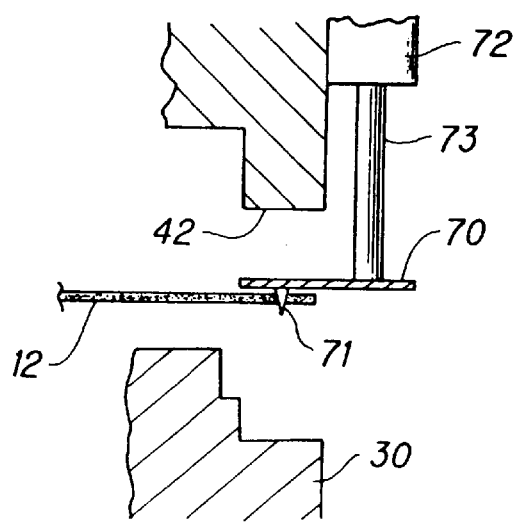
FIG. 6 is an enlarged sectional view showing the structure of the moveable surface skin retaining frame shown in FIG. 5.

First of all, as illustrated in FIG. 5, when the upper die half 40 is at its upper position, the surface skin member 12 is mounted on the surface skin retaining frame 60 and 70 by piercing the piercing pins 61 and 71 into the surface skin member 12. At this time point, the air cylinder 72 is in fully extended condition, and the fixed segment 60 and the moveable segment 70 of the surface skin retaining frame define a common mounting plane so that the surface skin member 12 can be readily mounted on the surface skin retaining frame 60 and 70. In particular, an automated surface skin member mounting device 80 can be used without any problem because the surface skin retaining frame 60 and 70 presents a mounting surface lying on a single plane.

Figure 7:
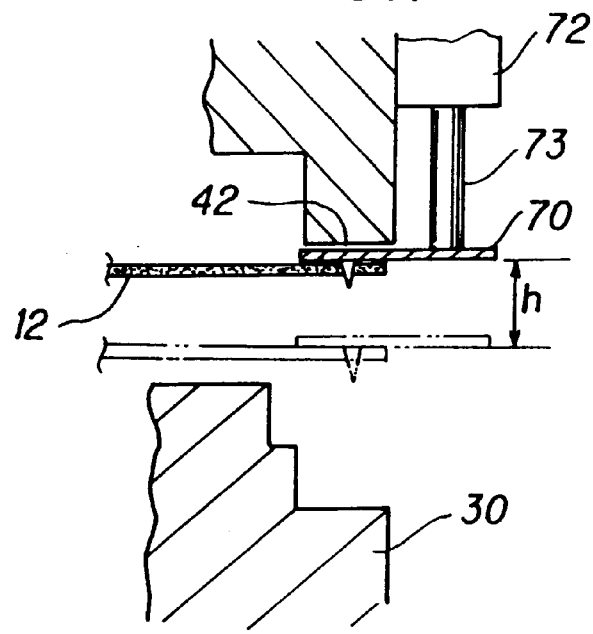
FIG. 7 is an enlarged sectional view showing the operation of the moveable surface skin retaining frame.
Figure 8:
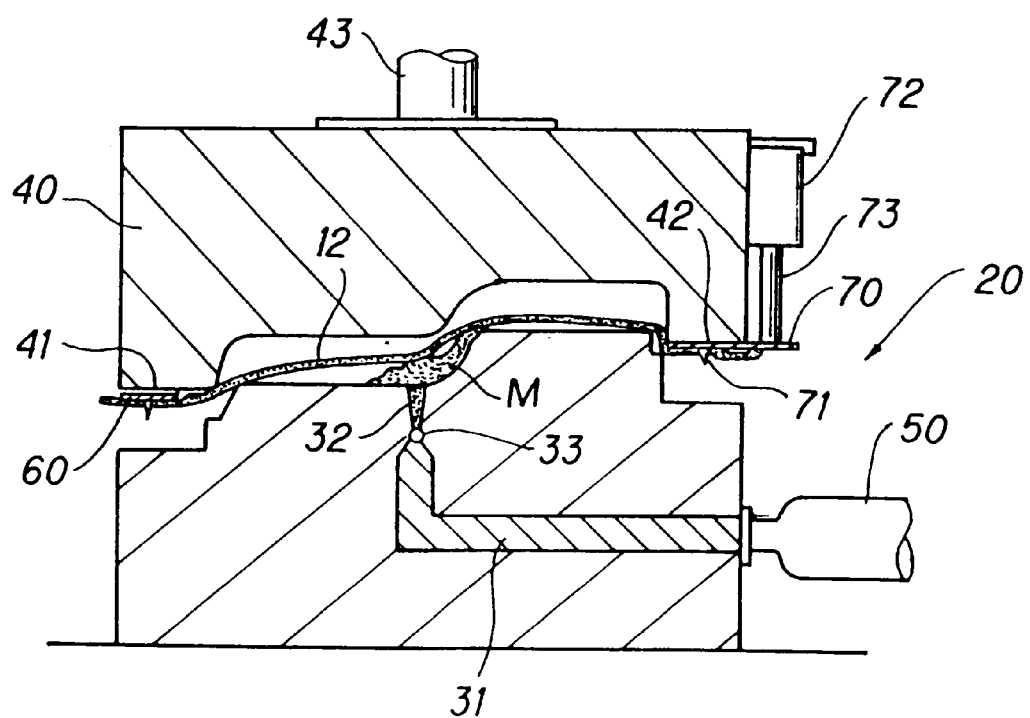
FIG. 8 is a sectional view showing the step of supplying molten resin according to the present invention.

Once the surface skin member 12 is mounted while the air cylinder 72 is extended, the moveable segment 70 of the surface skin retaining frame is lowered by the distance h so that the moveable segment 70 moves to the special parting line 42 as indicated by the imaginary lines in FIG. 7. Thereafter, the elevating mechanism 43 is activated so that the upper die half 40 is lowered until the clearance between the upper and lower die halves 30 and 40 is reduced to a prescribed value which may range, for instance, between 10 to 50 mm. Then, the injection molding device 50 distributes molten resin M on the die surface of the lower die half 30 from the gates 32 of the lower die half 30 as illustrated in FIG. 8.

Figure 9:
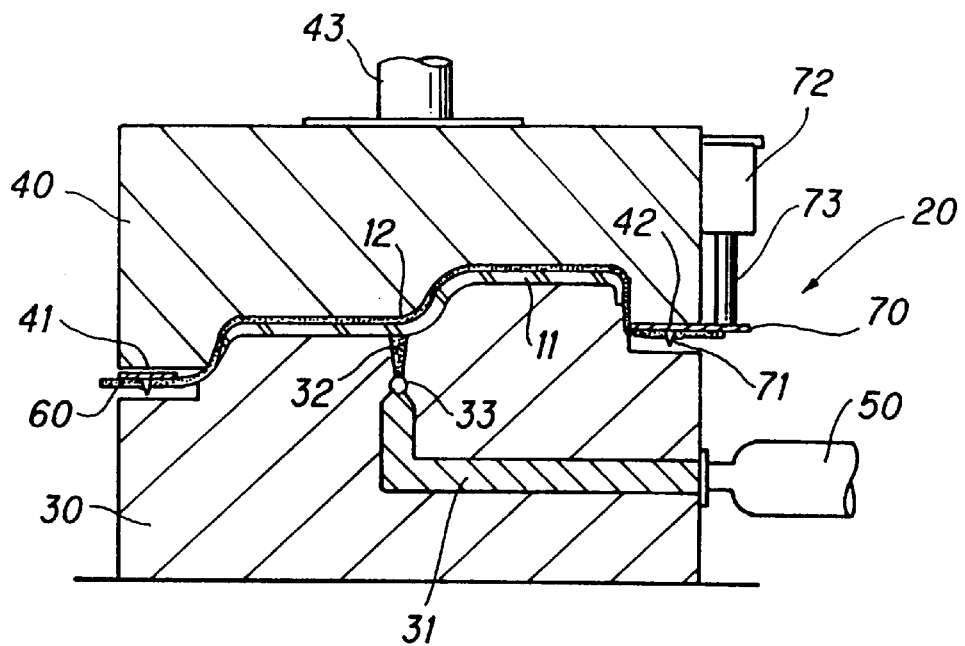
FIG. 9 is a sectional view showing the step of mold press forming according to the present invention.

Thereafter, as illustrated in FIG. 9, the upper die half 40 is further lowered until it reaches a lower dead point. By thus closing the upper and lower die halves 30 and 40 upon each other, the molten resin M is mold press formed into a prescribed shape, and the surface skin member 12 is integrally attached to the surface of the resin core member 11. At this time point, the moveable segment 70 of the surface skin retaining frame is positioned at the special parting line 42.

Because the surface skin member 12 is thus extended relatively evenly over the entire die surface before the upper die half 40 is closed upon the lower die half 30 to form the resin core member 11, the surface skin member 12 is substantially less constrained when it is extended over the resin core member 11 during the molding process as compared to the conventional process in which the surface skin member is more constrained from deformation by being clamped between the die surfaces of the upper and lower die halves. Therefore, the surface skin member 12 is not excessively extended in the region corresponding to the special parting line 42, and the rupture, thinning or whitening of the surface skin member 12 can be avoided. Also, the surface skin member 12 is prevented from losing its cushioning property from the thinning of the foamed lining 12b. Also, the spring back of the surface skin member 12 in the region corresponding to the special parting line 42, which is caused by the excessive extension of the surface skin member, can be avoided with the result that the warping of the laminated assembly can be avoided. Thus, the laminated assembly fabricated according to the present invention is provided with an accurate shape, a favorable external appearance and a satisfactory cushioning property.

In the above described embodiment, the movement of the moveable segment of the surface skin retaining frame 70 occurred immediately before the downward movement of the upper die half 40 for mold press forming, but it is also possible to carry out these two movements simultaneously in a synchronized fashion. As a matter of fact, the movement of the moveable segment of the surface skin retaining frame can be effected in a number of different relationships to the movement of the mold press forming die assembly. Preferably, the moveable segment of the surface skin member retaining frame occurs after the surface skin member is mounted on the surface skin retaining frame and before the die assembly is fully closed. According to a simple sequence, the moveable segment of the surface skin member retaining frame is moved by the prescribed stroke, and the die assembly is then closed from its fully open state to its fully closed state. Alternatively, the die assembly may be halfway closed initially, and the moveable segment of the surface skin member retaining frame is then moved by the prescribed stroke, which is followed by the full closure of the die assembly. This is advantageous in carrying out the mold press molding process in a highly satisfactory manner.

To reduce the time required to complete each molding cycle, the moveable segment of the surface skin retaining frame may be moved relative to the fixed segment thereof at least partly simultaneously as the first die half and the second die half of the mold press forming die assembly are closed relative to each other.

Figure 10:
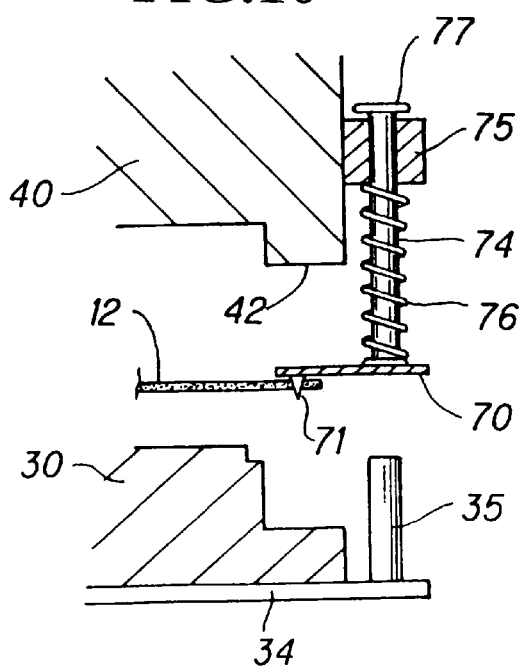
FIG. 10 is a sectional view of an essential part of a second embodiment of the molding device according to the present invention.
Figure 11:
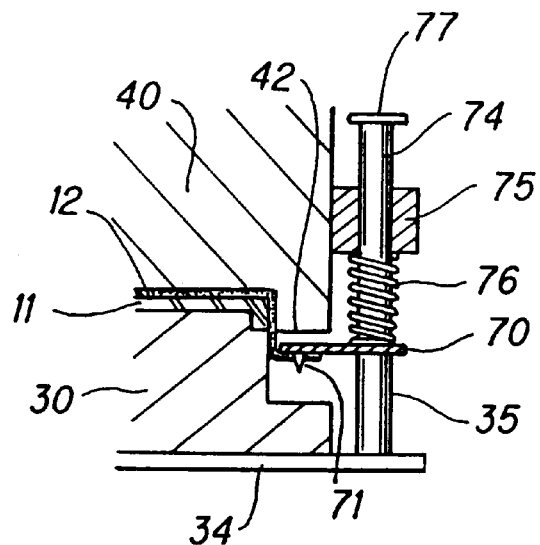
FIG. 11 is a sectional view showing the operation of the moveable surface skin retaining frame.
Figure 12:
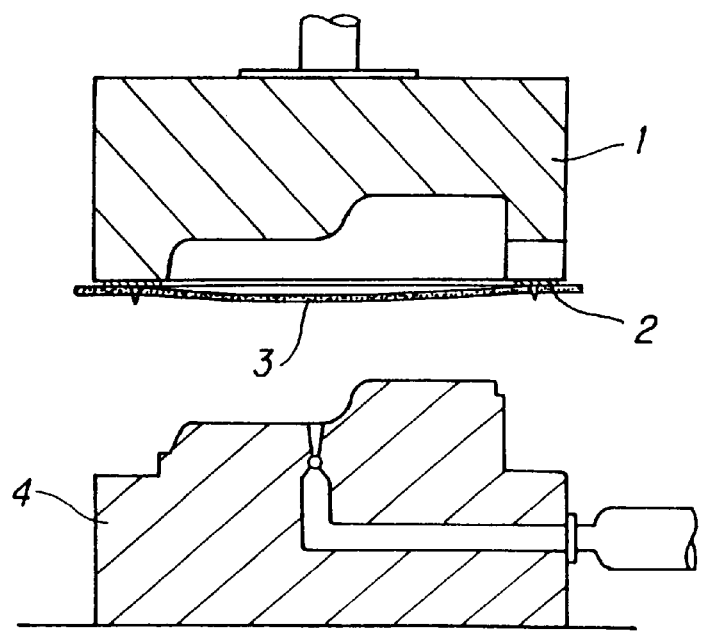
FIG. 12 is a sectional view showing the step of mounting a surface skin member according to the conventional method.
Figure 13:
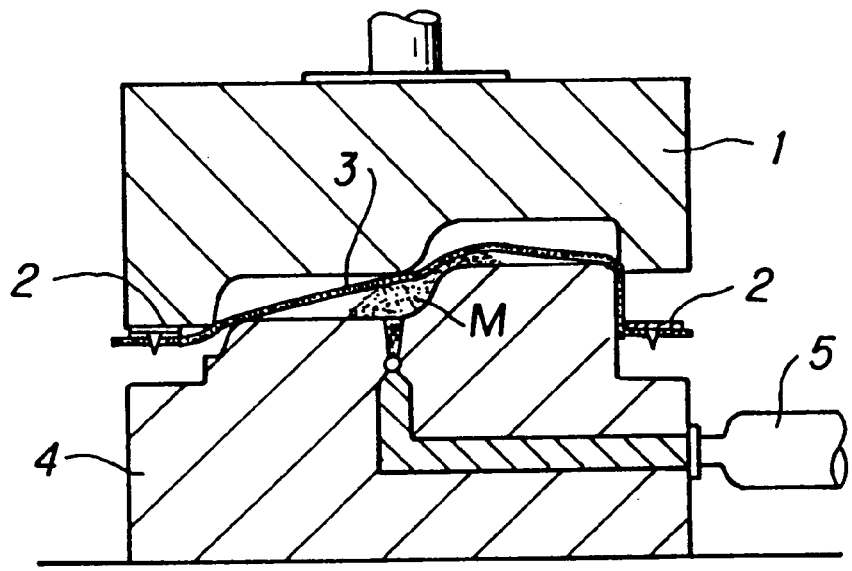
FIG. 13 is a sectional view showing the step of supplying molten resin according to the conventional method.
Figure 14:
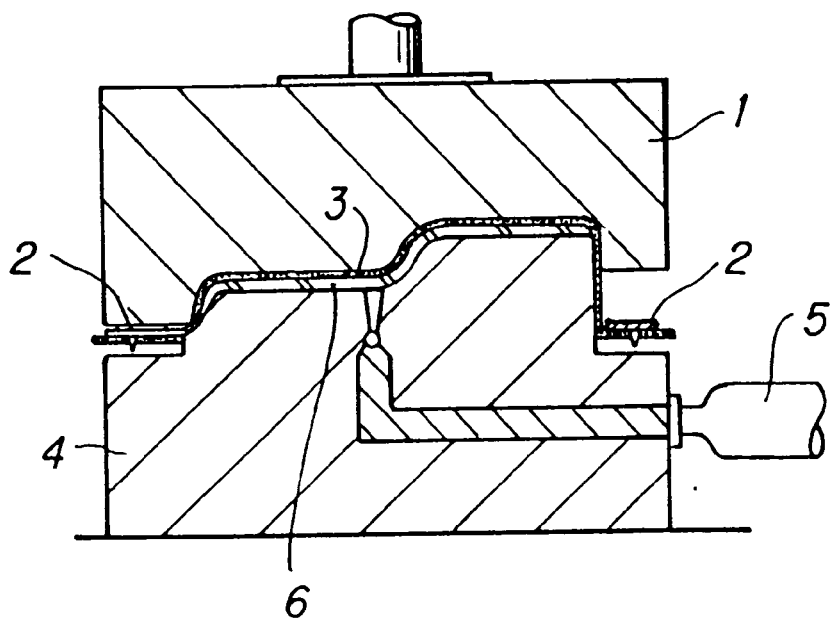
FIG. 14 is a sectional view showing the step of mold press forming according to the conventional method.
Figure 15:
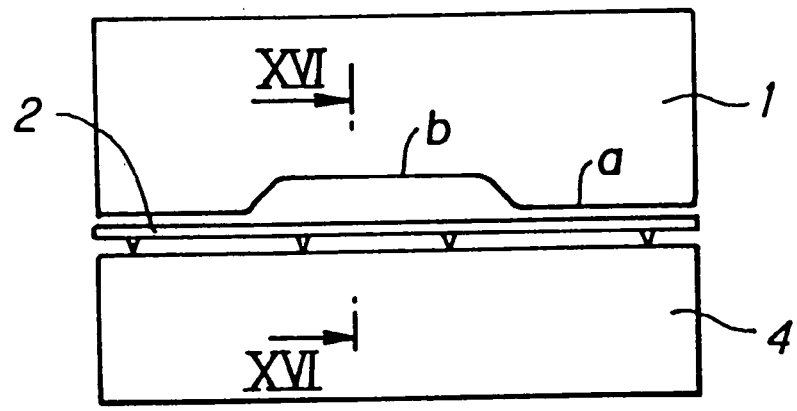
FIG. 15 is a side view of the conventional molding device.
Figure 16:
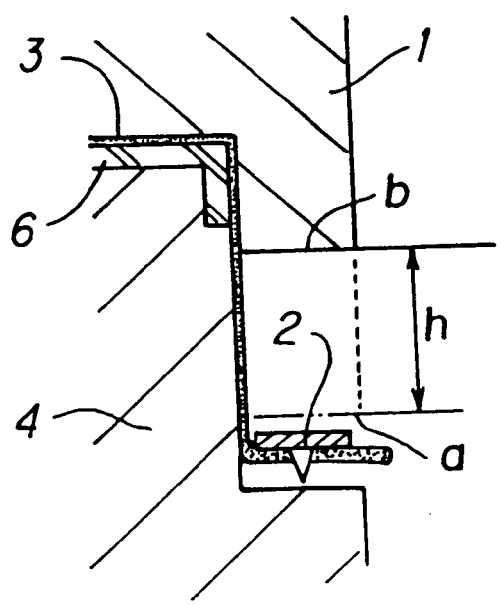
FIG. 16 is a sectional view taken along line XVI—XVI of FIG. 15.

FIGS. 10 and 11 show an essential part of the molding device 20 given as a second embodiment of the present invention. In this embodiment, a compression coil spring 76 is used instead of the air cylinder 72. The upper surface of the moveable segment 70 of the surface skin retaining frame is fixedly secured to the lower end of a support shaft 74 which is slidably passed through a bearing support member 75 which is in turn fixedly secured to a side surface of the upper die half 40 by welding. The coil spring 76 surrounds the support shaft 74, and normally urges the support shaft 74 downward relative to the bearing support member 75. A stopper 77, provided at the upper end of the support shaft 74, normally positions the moveable segment 70 of the surface skin retaining frame on the same plane as the fixed segment 60 of the surface skin retaining frame. Thus, the moveable segment 70 of the surface skin retaining frame is supported by the upper die half 40 via a spring urged lost motion mechanism which accommodates a certain vertical displacement of the moveable segment 70 relative to the fixed segment 60.

A lower table 34 attached to the lower die half 30 is provided with an abutting post 35 which is associated with the support shaft 74. The height of the abutting post 35 is determined so as to substantially coincide with the special parting line 42 when the upper die half 40 is at its lower dead point. Therefore, when mounting the surface skin member 12, the moveable segment 70 of the surface skin retaining frame is forced to its downmost position under the spring force of the coil springs 70, and is thereby placed on the same plane as the fixed segment 60 of the surface skin retaining frame.

After the surface skin member 12 is thus mounted, the upper die half 40 is lowered. As the upper die half 40 moves downward, the moveable segment 70 of the surface skin retaining frame comes into contact with the upper end of the abutting post 35, and is thereby prevented from making any further downward movement. The remaining part of the surface skin retaining frame or the fixed segment 60 thereof continues its downward movement along with the upper die half 40. The relative displacement between the fixed segment 60 and the moveable segment 70 of the surface skin retaining frame is accommodated by the resilient compression of the compression coil spring 70. Eventually, the special parting line 42 of the upper die half 40 reaches the same level as the moveable segment 70 of the surface skin retaining frame as illustrated in FIG. 11.

The second embodiment offers the substantially the same advantages as the first embodiment, with the added advantage of doing away with the pneumatic or other actuators for effecting the relatively displacement between the fixed segment 60 and the moveable segment 70 of the surface skin retaining frame.

Thus, according to the present invention, because the surface skin member is allowed to be relatively uniformly extended before the mold die assembly is closed and the surface skin member is integrally attached to the molded resin core member, the localized thinning, whitening, or loss of cushioning property of the surface skin member as well as the rupturing of the surface skin member can be effectively avoided. Also, residual stress in the surface skin member due to excessive extension during the molding process can be avoided so that the warping of the laminated assembly due to the spring back of the surface skin member can be avoided.

Although the present invention has been described in terms of preferred embodiments thereof, it is obvious to a person skilled in the art that various alterations and modifications are possible without departing from the scope of the present invention which is set forth in the appended claims.

What we claim is:

1. A method for integrally molding a laminated assembly of a resin core member made of thermoplastic material and a surface skin member made of deformable material in a mold press forming die assembly, which includes a first die half and a second die half defining a three-dimensional parting line therebetween comprising a general parting line and a special parting line elevated to the general parting line, and a surface skin retaining frame including a moveable segment and a fixed segment; comprising the steps of:

aligning said moveable segment of said surface skin retaining frame with said fixed segment thereof so as to define a substantially planar mounting surface at the general parting line for mounting a surface skin member thereon;

mounting a surface skin member made of deformable synthetic resin material on said moveable segment and said fixed segment which form said planar mounting surface of said surface skin retaining frame;

moving said moveable segment of said surface skin retaining frame to the special parting line in a substantially perpendicular direction relative to said fixed segment thereof to thereby preventing said surface skin member from being stretched excessively in localized parts thereof a peripheral part of said surface skin member to said three-dimensional parting line thereby preventing said surface skin member from being stretched excessively in localized parts;

supplying molten thermoplastic resin material onto a die surface of one of said die halves; and closing said first die half and said second die half of said mold press forming die assembly relative to each other to finally form said resin core member and integrally attach said surface skin member onto a surface of said resin core member.

2. A method for integrally molding a laminated assembly according to claim 1, wherein said moveable segment of said surface skin retaining frame is moved relative to said fixed segment thereof after a surface skin member is mounted on said surface skin retaining frame and before said die assembly is fully closed.

3. A method for integrally molding a laminated assembly according to claim 2, wherein said moveable segment of said surface skin member retaining frame is moved by a prescribed stroke, and said die assembly is then closed from a fully open state to a fully closed state.

4. A method for integrally molding a laminated assembly according to claim 2, wherein said die assembly is closed from a fully open state to a partially closed state, and said moveable segment of said surface skin member retaining frame is moved by a prescribed stroke before said die assembly is fully closed.

5. A method for integrally molding a laminated assembly according to claim 2, wherein said moveable segment of said surface skin retaining frame is moved relative to said fixed segment thereof at least partly simultaneously as said first die half and said second die half of said mold press forming die assembly are closed relative to each other.

6. A method for integrally molding a laminated assembly according to claim 5, wherein said simultaneous movement of said moveable segment is effected by an arrangement in which said fixed segment of said surface skin retaining frame is securely attached to one of said die halves while said moveable segment of said surface skin retaining frame is attached to said one die half via a spring urged lost motion mechanism, said other die half being provided with a stopper post which engages said moveable segment of said surface skin retaining frame and displaces said moveable segment relative to said fixed segment as said one die half is moved toward said other die half.

7. A method for integrally molding a laminated assembly according to claim 4, wherein said moveable segment of said surface skin retaining frame is moved relative to said fixed segment thereof at least partly simultaneously as said first die half and said second die half of said mold press forming die assembly are closed relative to each other.

8. A method for integrally molding a laminated assembly according to claim 7, wherein said simultaneous movement of said moveable segment is effected by an arrangement in which said fixed segment of said surface skin retaining frame is securely attached to one of said die halves while said moveable segment of said surface skin retaining frame is attached to said one die half via a spring urged lost motion mechanism, said other die half being provided with a stopper post which engages said moveable segment of said surface skin retaining frame and displaces said moveable segment relative to said fixed segment as said one die half is moved toward said other die half.

\* \* \* \* \*